United States Patent
Fujimori (10) Patent No.: US 9,172,460 B2
(45) Date of Patent: Oct. 27, 2015

(54) TRANSMISSION EQUIPMENT AND PATH SELECTION METHOD

(71) Applicant: FUJITSU LIMITED, Kawasaki-shi, Kanagawa (JP)

(72) Inventor: Tomoyoshi Fujimori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 54 days.

(21) Appl. No.: 14/250,812

(22) Filed: Apr. 11, 2014

(65) Prior Publication Data

US 2014/0314401 A1 Oct. 23, 2014

(30) Foreign Application Priority Data

Apr. 18, 2013 (JP) ................................. 2013-087046

(51) Int. Cl.
*H04B 10/038* (2013.01)
*H04L 12/26* (2006.01)
*H04Q 11/00* (2006.01)

(52) U.S. Cl.
CPC ......... *H04B 10/038* (2013.01); *H04Q 11/0005* (2013.01); *H04Q 2011/0043* (2013.01)

(58) Field of Classification Search
CPC .. H04B 10/038; H04Q 11/0005; H04L 47/34; H04L 47/6255
USPC .................................................... 398/5, 2, 1
See application file for complete search history.

(56) References Cited

U.S. PATENT DOCUMENTS

| 7,215,637 | B1 * | 5/2007 | Ferguson et al. | 370/230.1 |
| 8,300,526 | B2 * | 10/2012 | Saito et al. | 370/230 |
| 2002/0141403 | A1 * | 10/2002 | Akahane et al. | 370/389 |
| 2003/0219014 | A1 * | 11/2003 | Kotabe et al. | 370/375 |
| 2008/0101354 | A1 * | 5/2008 | Arndt | 370/389 |
| 2014/0314401 | A1 * | 10/2014 | Fujimori | 398/5 |

FOREIGN PATENT DOCUMENTS

| JP | 2001-69166 | 3/2001 |
| JP | 2002-300193 | 10/2002 |
| JP | 2003-338837 | 11/2003 |
| JP | 2008-72181 | 3/2008 |

* cited by examiner

*Primary Examiner* — Oommen Jacob
(74) *Attorney, Agent, or Firm* — Fujitsu Patent Center (57) ABSTRACT

Transmission equipment comprises: a measurement unit configured to measure respective transmission delays of the plurality of paths by using a frame transmitted between the transmission equipment and correspondent equipment; a detector configured to detect a priority of an input packet; a selector configured to select a path for transmitting the input packet from among the plurality of paths; and a frame processing unit configured to transmit a frame onto which the input packet is mapped to the correspondent equipment through a path selected by the selector. The selector selects an alternative path for transmitting the input packet from among the plurality of paths based on the priority of the input packet detected by the detector and respective transmission delays of the plurality of paths measured by the measurement unit when a failure occurs in a path that has been selected by the selector.

7 Claims, 12 Drawing Sheets

| PHB | | DSCP VALUE (BINARY) | DSCP VALUE (DECIMAL) |
|---|---|---|---|
| AF (Assured Forwarding) | AF11 | 001 010 | 10 |
| | AF12 | 001 100 | 12 |
| | AF13 | 001 110 | 14 |
| | AF21 | 010 010 | 18 |
| | AF22 | 010 100 | 20 |
| | AF23 | 010 110 | 22 |
| | AF31 | 011 010 | 26 |
| | AF32 | 011 100 | 28 |
| | AF33 | 011 110 | 30 |
| | AF41 | 100 010 | 34 |
| | AF42 | 100 100 | 36 |
| | AF43 | 100 110 | 38 |
| EF (Expedited Forwarding) | | 101 110 | 46 |

FIG. 7B

| OTN PATH | DELAY | PCP 1 | 2 | 3 | 4 | 5 | 6 | 7 |
|---|---|---|---|---|---|---|---|---|
| #1 | 5.5 | | | | | | | ○ |
| #2 | 12.3 | △ | | | | | | |
| #3 | 11.5 | | △ | | | | | |
| ⋮ | | | | | | | | |
| #n-1 | 4.5 | | | | | | △ | |
| #n | 4.3 | | | | | | | △ |

F I G. 8 A

| OTN PATH | DELAY | PCP 1 | 2 | 3 | 4 | 5 | 6 | 7 |
|---|---|---|---|---|---|---|---|---|
| #1 | 5.5 | | | | | | | ○ |
| #2 | 12.3 | △ | | | | | | |
| #3 | 11.5 | | △ | | | | | |
| ⋮ | | | | | | | | |
| #n-1 | 4.5 | | | | | | | △ |
| #n | — | | | | | | | |

F I G. 8 B

| OTN PATH | DELAY | PCP 1 | 2 | 3 | 4 | 5 | 6 | 7 |
|---|---|---|---|---|---|---|---|---|
| #1 | 5.5 | | | | | | | ○ |
| #2 | 12.3 | △ | | | | | | |
| #3 | 11.5 | | △ | | | | | |
| ⋮ | | | | | | | | |
| #n-1 | 4.5 | | | | | △ | | |
| #n | 4.3 | | | | | | △ | |
| #n+1 | 3.9 | | | | | | | △ |

F I G. 8 C

| OTN PATH | DELAY | DSCP | | | | | | | | | | | |
|---|---|---|---|---|---|---|---|---|---|---|---|---|---|
| | | AF11 | AF12 | AF13 | AF21 | AF22 | AF23 | AF31 | AF32 | AF33 | AF41 | AF42 | AF43 | EF |
| #1 | 5.5 | | | | | | | | | | | | | ○ |
| #2 | 12.3 | △ | | | | | | | | | | | | |
| #3 | 11.5 | | △ | | | | | | | | | | | |
| ‥ | | | | | | | | | | | | | | |
| #n−1 | 4.5 | | | | | | | | | | | | △ | |
| #n | 4.3 | | | | | | | | | | | | | △ |

TRANSMISSION EQUIPMENT AND PATH SELECTION METHOD

CROSS-REFERENCE TO RELATED APPLICATION

This application is based upon and claims the benefit of priority of the prior Japanese Patent Application No. 2013-087046, filed on Apr. 18, 2013, the entire contents of which are incorporated herein by reference.

FIELD

The embodiments discussed herein are related to transmission equipment and a path selection method used in a redundant network.

BACKGROUND

Networks that transmit information by using Ethernet (registered trademark) packets have become widespread. Also, Optical Transport Networks (OTNs) defined in ITU-T Recommendation G.709 are becoming widespread as networks for example large-volume trunk line systems. Thus, transmission equipment that maps Ethernet packets onto OTN frames and transmits the packets has been implemented in practical use. In other words, transmission equipments having the Ethernet over OTN function have been implemented in practical use.

In some cases, networks such as those described above have a redundant configuration in order to enhance their reliability. In Ethernet over OTN for example, a plurality of OTN paths are provided between transmission equipments. Also, transmission equipment includes a switch for selecting an output port (i.e., an OTN path) for Ethernet packets. In such a case, when a failure has occurred in a currently used OTN path, the switch of transmission equipment selects a different OTN path. This configuration makes it possible to continue communications even when a failure has occurred in a currently used system.

As a related technique, a device that selects a transmission path in accordance with a request from a communication system, a router that distributes packets in accordance with the priority of the packets, and the like are known (for example, Japanese Laid-open Patent Publication No. 2008-72181, Japanese Laid-open Patent Publication No. 2002-300193, Japanese Laid-open Patent Publication No. 2001-69166, and Japanese Laid-open Patent Publication No. 2003-338837).

The priority of an Ethernet packet is specified by using a VLAN tag in layer 2 defined by IEEE802.1Q, a TOS (Type Of Service) defined by RFC2474, and the like. For example, Ethernet packets that transmit audio data or video image data are often given high priority. Further, it is desirable that Ethernet packets with high priority be stored in OTN frames and thereafter be transmitted through an OTN path whose transmission delay is small.

According to the conventional techniques, however, when a failure has been detected in a currently used OTN path, transmission equipment selects an available OTN path without taking the priority of Ethernet packets into consideration. This may sometimes cause a situation where Ethernet packets with a high priority are transmitted through an GTN path whose delay is large. In such a case, there is a possibility that the quality of the audio or video image will deteriorate.

The use of an Ethernet test signal permits the measurement of transmission delays of packets. However, the Ethernet test signal is transmitted while the transmission of actual data (for example client data) is in a halted state. This means that when the Ethernet test signal is used for measuring a transmission delay, the transmission of actual data may be halted. Accordingly, when, for example, a line has been added after the start of communication services, it is difficult to measure the transmission delay of that added line by using the Ethernet test signal.

SUMMARY

According to an aspect of the embodiments, transmission equipment that is used in a transmission system in which a plurality of paths are provided between the transmission equipment and correspondent equipment comprises: a measurement unit configured to measure respective transmission delays of the plurality of paths by using a frame transmitted between the transmission equipment and the correspondent equipment; a detector configured to detect a priority of an input packet; a selector configured to select a path for transmitting the input packet from among the plurality of paths; and a frame processing unit configured to transmit a frame onto which the input packet is mapped, to the correspondent equipment through a path selected by the selector. The selector selects an alternative path for transmitting the input packet from among the plurality of paths based on the priority of the input packet detected by the detector and respective transmission delays of the plurality of paths measured by the measurement unit when a failure occurs in a path that has been selected by the selector.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
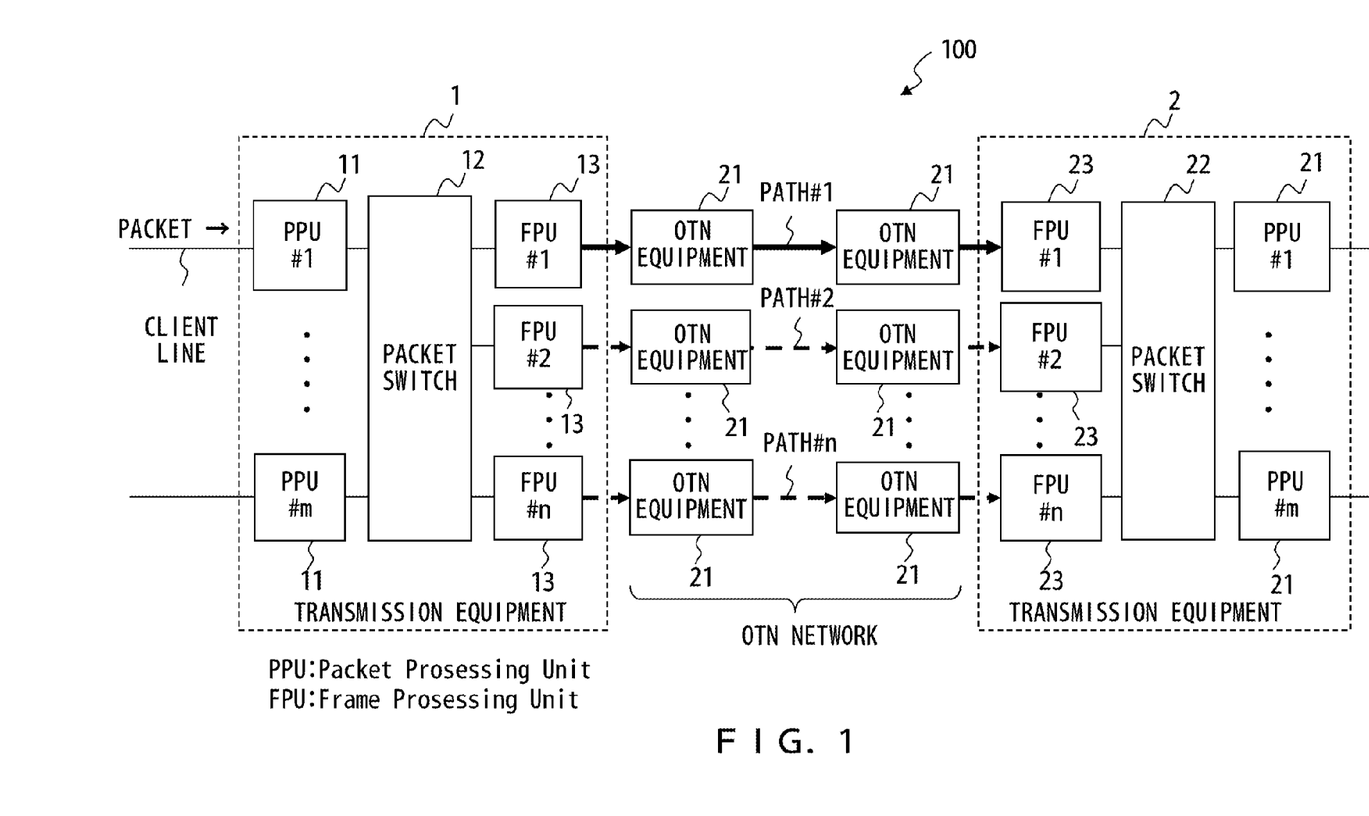
FIG. 1 illustrates a configuration of a transmission system according to an embodiment of the present invention.

FIG. 1 illustrates a configuration of a transmission system according to an embodiment of the present invention. A transmission system 100 according to an embodiment includes, as illustrated in FIG. 1, transmission equipment 1, transmission equipment 2, and a plurality of OTN paths #1 through #n that respectively transmit frames between the transmission equipments 1 and 2.

The transmission system 100 is capable of transmitting data bidirectionally between the transmission equipments 1 and 2. However, in the explanations below, a case will be described where data is transmitted from the transmission equipment 1 to the transmission equipment 2.

OTN (Optical Transport Network) frames are transmitted between the transmission equipments 1 and 2. In other words, the transmission equipments 1 and 2 are connected to an OTN network. Each of OTN paths #1 through #n provided between the transmission equipments 1 and 2 is implemented by one or a plurality of OTN equipments 21 and optical fiber cables. An optical fiber cable includes a pair of optical fibers for transmitting optical signals bidirectionally. OTN paths #1 through #n connect the transmission equipments 1 and 2 via routes that are physically different from each other. However, part of the route of a path may overlap with part of the route of a different path. The OTN equipment 21 transfers OTN frames to a destination node in accordance with, for example, an instruction from a network management system (not illustrated).

The transmission equipment 1 includes m packet processing units 11 (#1 through #m), a packet switch 12, and n frame processing units 13 (#1 through #n). m may be one.

n is a value greater than or equal to three in this example.

The packet processing unit 11 is capable of accommodating a client line. The Client line transmits Ethernet (registered trademark) packets in this example. In other words, the packet processing unit 11 is capable of terminating Ethernet packets. The packet processing unit 11 may be implemented by for example an Ethernet card. Note that in the description below, an Ethernet packet may also be referred to as a "packet" in order to simplify the explanations.

The packet switch 12 provides paths between m packet processing units 11 and n frame processing units 13 in accordance with an instruction from a controller (not illustrated) configured in the transmission equipment 1. When, for example, the transmission equipment 1 transmits a packet received via the packet processing unit 11#1 to the transmission equipment 2 through OTN path #1, the packet switch 12 guides the received packet to the frame processing unit 13#1. It is also possible to provide paths between one of the packet processing units 11 and the plurality of frame processing units 13.

The frame processing unit 13 generates OTN frames and outputs them to corresponding OTN path. Thereby, OTN frames are transmitted through the OTN path and received by the transmission equipment 2. During this process, when the frame processing unit 13 receives packets from the packet processing unit 11, the frame processing unit 13 maps the packets onto payloads of OTN frames, and transmits to the transmission equipment 2 the OTN frames onto which the received packets are mapped. Also, even when the frame processing unit 13 does not receive packets from the packet processing unit 11, the frame processing units 13 generates OTN frames and transmits them to the transmission equipment 2. In such a case, however, the frame processing unit 13 stores for example staff, dummy data, or the like in the payloads of OTN frames. The frame processing unit 13 is implemented by for example an Ethernet over OTN card. The Ethernet over OTN card has a function of mapping a packet onto an OTN frame and a function of reproducing a packet mapped onto a payload of an OTN frame.

The transmission equipment 2 includes m packet processing units 21 (#1 through #m), a packet switch 22, and n frame processing units 23 (#1 through #n). The frame processing unit 23 demaps received OTN frames so as to reproduce packets. The packet switch 22 provides paths between the frame processing unit 23 and the packet processing unit 21 in accordance with an instruction from a controller (not illustrated) configured in the transmission equipment 2. The packet processing unit 21 transmits to a client packets received from the transmission equipment 1.

As described above, the transmission system 100 includes a plurality of OTN paths #1 through #n between the transmission equipments 1 and 2. When the transmission equipment 1 transmits, to the transmission equipment 2, a packet received via a client line, the transmission equipment 1 selects an OTN path for transmitting that packet from among the plurality of OTN paths #1 through #n. Thereafter, the transmission equipment 1 maps the received packet onto an OTN frame, and transmits that OTN frame via the selected OTN path. In the example illustrated in FIG. 1, OTN path #1 is selected, and an OTN frame onto which the received packet has been mapped is transmitted via OTN path #1 from the transmission equipment 1 to the transmission equipment 2. Thereby, the transmission equipment 2 can demap the OTN frame received from the transmission equipment 1 so as to reproduce the packet. In other words, the transmission equipments 1 and 2 both have an Ethernet over OTN function.

Also, in the transmission system 100 illustrated in FIG. 1, n OTN paths #1 through #n are provided between the transmission equipments 1 and 2 for m client lines. This configuration may sometimes be referred to as "m:n redundant configuration" or "m:n redundant connection".

A pair of the frame processing units 13 and 23 transmit OTN frames bidirectionally and continuously. When packet data is input, each of the frame processing units 13 and 23 outputs an OTN frame storing that packet data to a corresponding OTN path.

Figure 2:
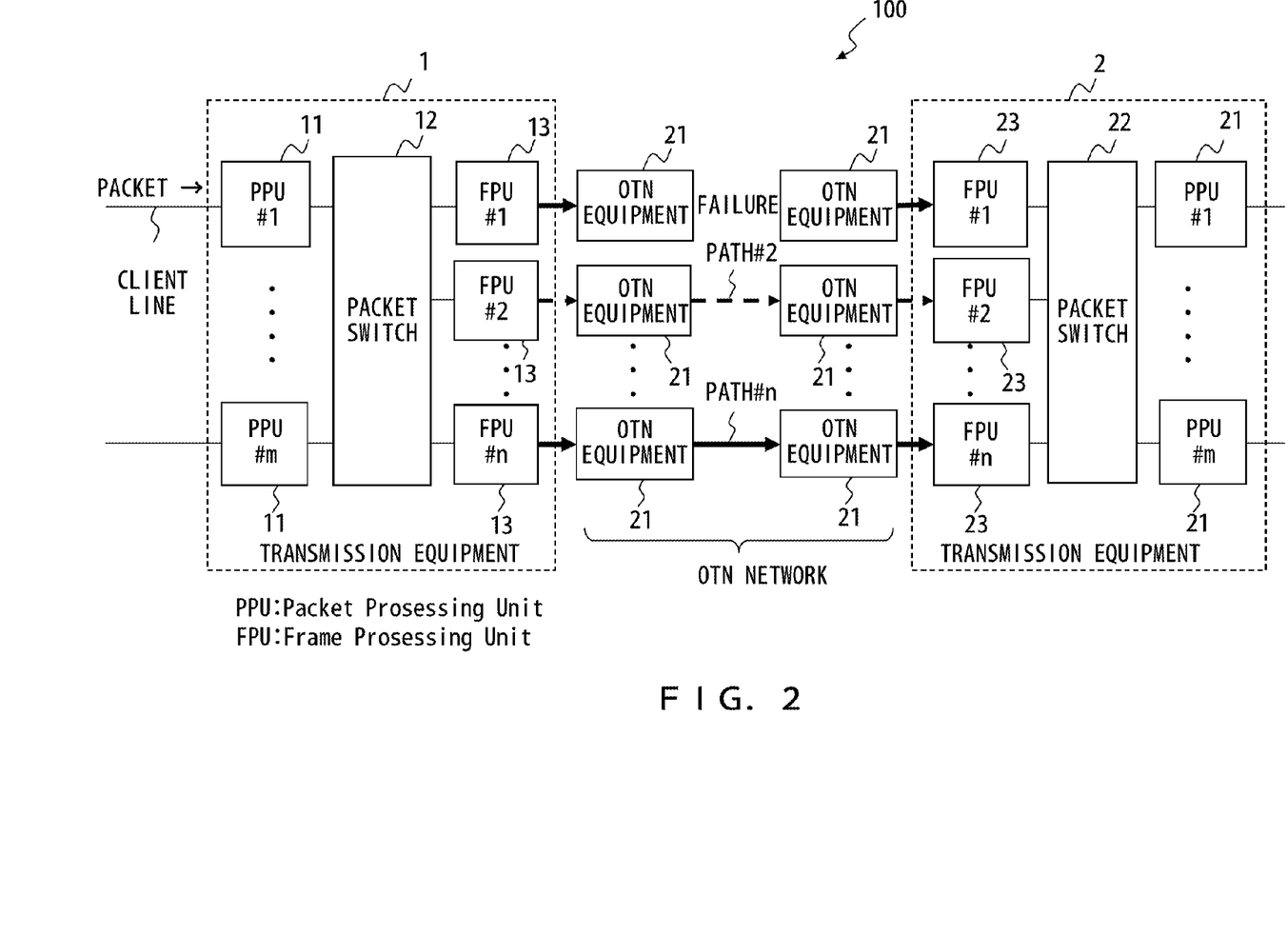
FIG. 2 explains path selection.

When a failure has occurred in an OTN path transmitting an OTN frame in the transmission system 100, path selection is performed. In the example illustrated in FIG. for example, an OTN frame including packet data is transmitted through OTN path #1. In other words, in the example illustrated in FIG. 1, OTN path #1 is a currently used path. When a failure has occurred in the currently used path (i.e., OTN path #1) in this situation as illustrated in FIG. 2, the transmission equipment 1 performs path selection. In the example illustrated in FIG. 2, the transmission equipment 1 has selected OTN path #n as an alternative path for OTN path #1. In this case, the packet switch 12 guides an input packet to the frame processing unit 13#n in the transmission equipment 1. By so doing, an OTN frame containing the packet data is transmitted through OTN path #n from the transmission equipment 1 to the transmission equipment 2.

It is assumed that an OTN path newly selected in the transmission equipment 1 is reported to the transmission equipment 2. Methods of reporting a newly selected OTN path to correspondent equipment are not limited particularly. An OTN path selected in the transmission equipment 1 is reported to the transmission equipment 2 for example by using an OTN frame. Alternatively, an OTN path selected in the transmission equipment 1 may be reported to the transmission equipment 2 via a network management system (not illustrated). Regardless of methods of the reporting, the transmission equipment 2 reproduces a packet from an OTN frame received through the newly selected OTN path in accordance with the report from the transmission equipment 1.

In a path selection method of an embodiment, a new OTN path (i.e., an alternative path) is selected in accordance with the priority of an input packet and the transmission delay of each of OTN paths #1 through #n. When, for example, a packet with high priority is to be transmitted, an OTN path whose transmission delay is small is selected. In this example, "packet with high priority" is a packet containing data that requests small transmission delay. A packet containing audio data, for example, is an example of a packet with high priority.

When a packet with low priority is to be transmitted, an OTN path whose transmission delay is large is selected.

Thereby, a situation is avoided where an OTN path whose transmission delay is small is occupied by the transmission of packets with low priority.

Conventional techniques do not take into consideration the priority of packets or the transmission delay of each of OTN paths #1 through #n in the path selection performed in response to a failure. A conventional method selects as an alternative path an GIN path to which the smallest path number has been assigned from among available OTN paths. For example, in the example illustrated in FIGS. 1 and 2, when a failure occurs in OTN path #1, OTN path #2 is selected. It is assumed for example that an input packet contains audio data and that the transmission delay of OTN path #2, which is newly selected, causes a large transmission delay. In this situation, there is a possibility of deterioration in the quality of the audio in a client device.

By contrast, in the transmission system 100 according to an embodiment, when a failure has occurred in an OTN path that transmits a packet with high priority (for example, a packet containing audio data), an OTN path whose transmission delay is small is newly selected as an alternative path. Accordingly, after performing the path selection in response to a failure, the deterioration in the quality of audio is avoided or suppressed in a client device.

FIRST EMBODIMENT

Figure 3:
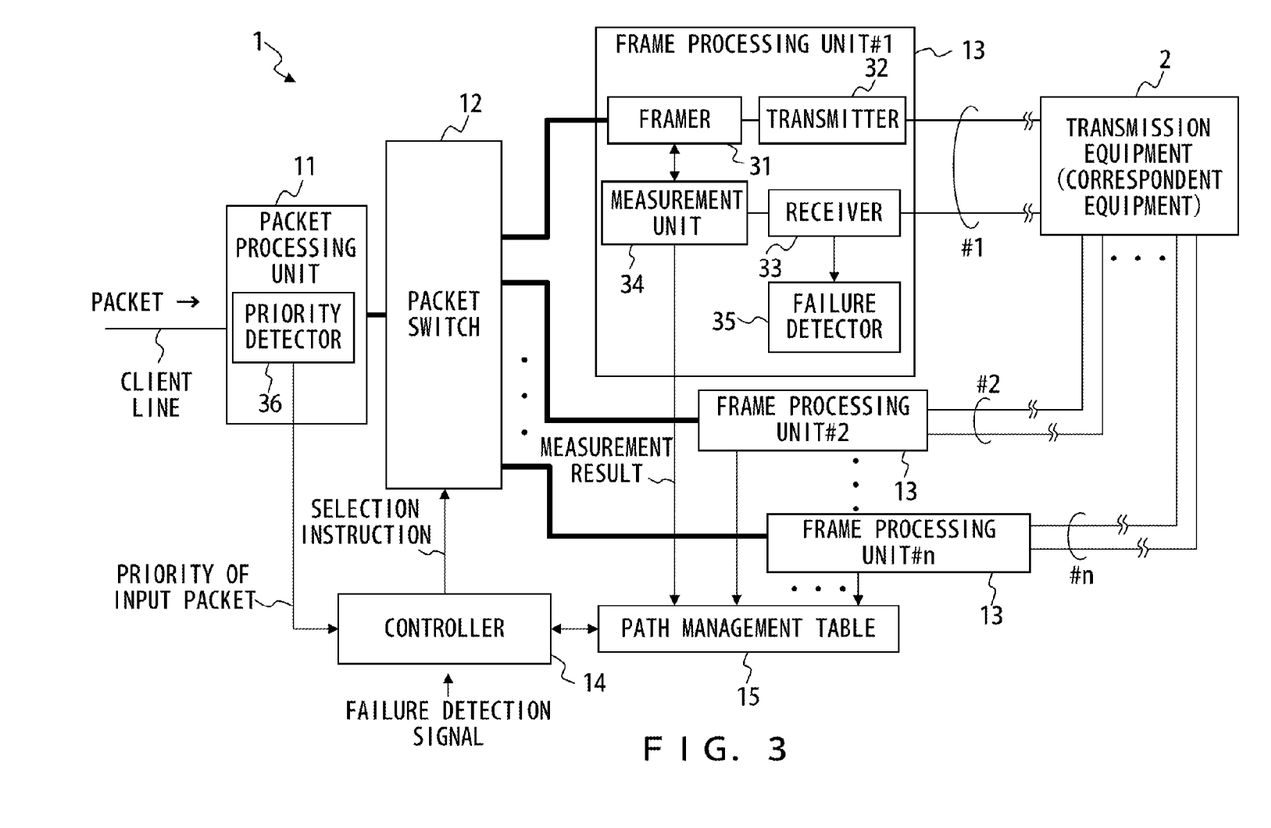
FIG. 3 illustrates a configuration of transmission equipment according to a first embodiment.

FIG. 3 illustrates a configuration of transmission equipment according to a first embodiment. The transmission equipment 1 illustrated in FIG. 3 corresponds to the transmission equipment 1 illustrated in FIG. 1. Also, the function of receiving an OTN frame containing client data is omitted in FIG. 3.

As described above, the transmission equipment 1 includes the plurality of frame processing units 13. Each of the frame processing units 13 includes a framer 31, a transmitter 32, a receiver 33, a measurement unit 34, and a failure detector 35.

Figure 4:
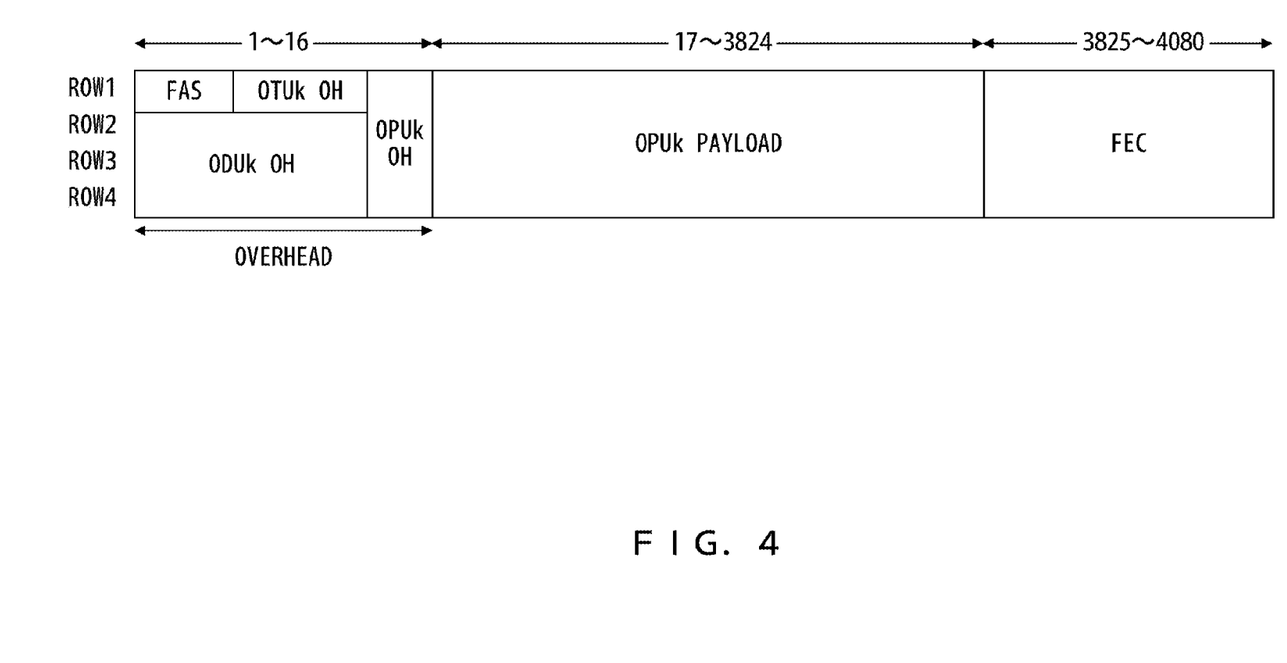
FIG. 4 illustrates the format of an OTN frame.

The framer 31 generates an OTN frame. As illustrated in FIG. 4, an OTN frame has 4080 columns by 4 rows. Also, the OTN frame includes an overhead, an OPUk payload, and an FEC.

The overhead is arranged in the 1st through 16th columns of an OTN frame. The overhead includes an FAS (Frame Alignment Signal), an OTU (Optical Channel Transport Unit)k overhead, an ODU (Optical Channel Data Unit)k overhead, and an OPU (Optical Channel Payload Unit) k overhead. The overhead is used for connection and managing quality. The OPUk payload is arranged in the 17th through 3824th columns of an OTN frame. Onto the OPUk payload, a client signal is mapped. An ODUk is generated by adding the overhead to the OPUk payload. The FEC is arranged in the 3825th through 4080th columns of an OTN frame. An FEC is used for correcting an error that has occurred during transmission. An OTUk is generated by adding the FEC to the ODUk.

The transmitter 32 outputs an OTN frame generated by the framer 31 to a corresponding OTN path. By so doing, an OTN frame is transmitted to the transmission equipment 2 via one or a plurality of OTN equipments. The receiver 33 receives an OTN frame transmitted from the transmission equipment 2 via one or a plurality of OTN equipments.

The measurement unit 34 measures a transmission delay between the transmission equipments 1 and 2. In this example, the measurement unit 34 measures a transmission delay between the transmission equipments 1 and 2 by using a DM (Delay Measurement) bit of an OTN frame.

Figure 5:
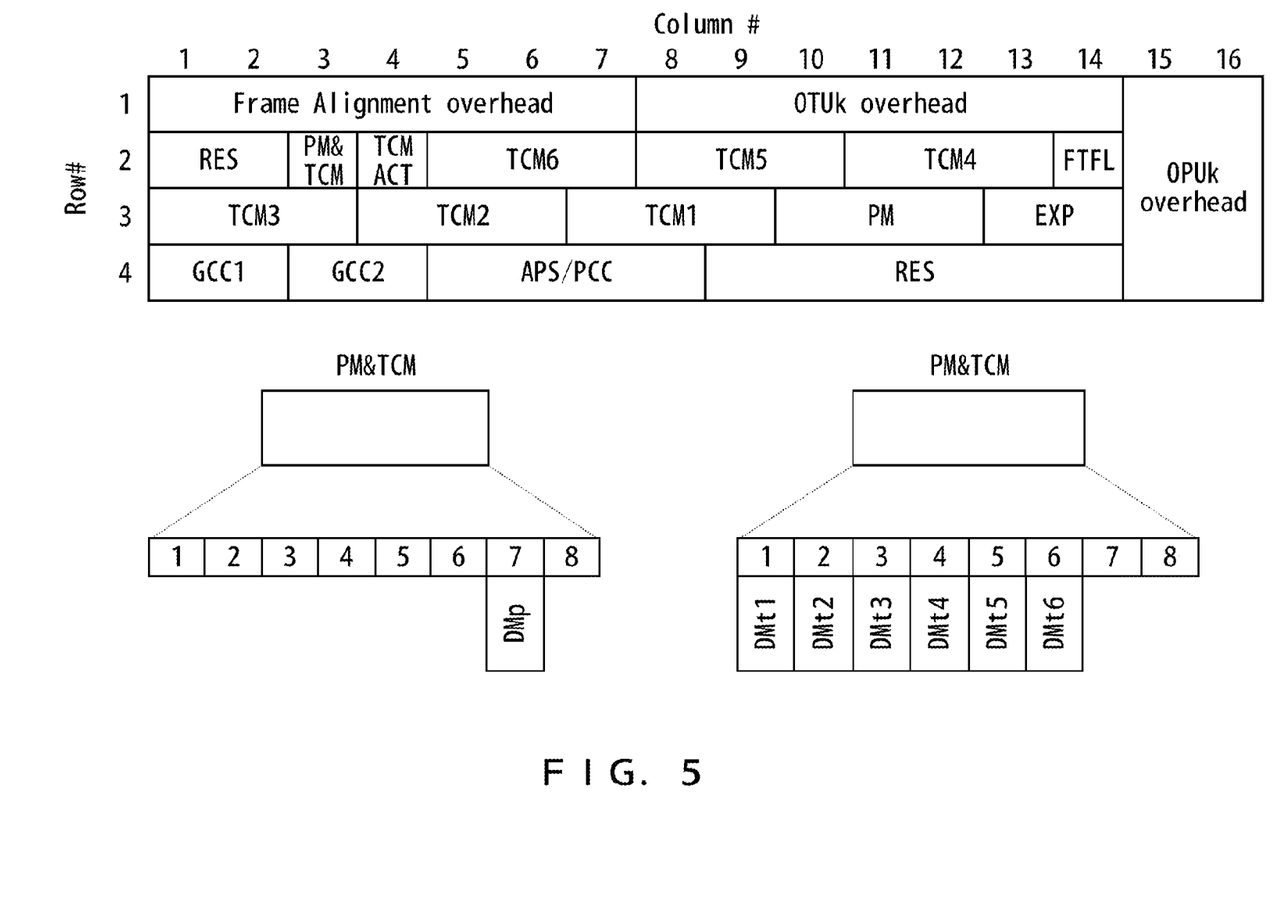
FIG. 5 illustrates the overhead of an OTN fame.

FIG. 5 illustrates the overhead of an OTN frame. DM bits are provided in "PM&TCM (Path Monitoring and Tandem Connection Monitoring)" of the ODUk overhead. One byte is assigned to the PM&TCM. DMti (Delay Measurement of TCMi) (i=1 through 6) is provided in the 1st through 6th bits of the PM&TCM, and DMp (Delay Measurement of ODUk Path) is provided in the 7th bit. When transmission delay is measured in an End-to-End manner, for example, DMp is used. DMti can be used for measuring transmission delays with respect to desired correspondent equipment. Note that explanations of other bits in the overhead of an OTN frame will be omitted.

Brief explanations will be given for a method of measuring a transmission delay by using the DM bit (DMp or DMTi). It is assumed in this example that before the start of delay measurement by the measurement unit 34, "0" is maintained as the value of the DM bit of each OTN frame generated by the framer 31. In other words, it is assumed that OTN frames having "DM bit=0" are transmitted continuously to the transmission equipment 2. The transmission equipment 2 extracts the value of the DM bit of an OTN frame received from the transmission equipment 1 and sets the extracted value into the DM bit of an OTN frame transmitted to the transmission equipment 1. That is, DM bits transmitted from the transmission equipment 1 to the transmission equipment 2 are sequentially returned from the transmission equipment 2 to the transmission equipment 1.

When delay measurement starts, the framer 31 inverts the values of the DM bits. In this example, DM bits are inverted from "0" to "1". Accordingly, when a certain period of time has elapsed since the start of the delay measurement, OTN frames having "DM bit=1" reach the transmission equipment 2. Thereafter, OTN frames having "DM bit=1" reach the transmission equipment 1 from the transmission equipment 2. Then, in the transmission equipment 1, the measurement unit 34 detects the timing at which the DM bits in received OTN frames change from "0" to "1". Accordingly, the measurement unit 34 measures a period of time between the start of the delay measurement and the reception of inverted DM bits, and thereby can calculate the transmission delay between the transmission equipments 1 and 2. A method of measuring a transmission delay by using DM bits is defined by ITU-T Recommendation G.709.

As described above, the measurement unit 34 of each of the frame processing units 13 measures a transmission delay of its corresponding path. For example, the measurement unit 34 of the frame processing unit 13#1 measures a transmission delay of OTN path #1, and the measurement unit 34 of the frame processing unit 13#n measures a transmission delay of =path #n. Measurement results obtained by the measurement units 34 of the respective frame processing units 13 are recorded in a path management table 15. The path management table 15 will be explained later.

The failure detector 35 detects a failure in the corresponding OTN path. For example, the failure detector 35 of the frame processing unit 13#1 monitors a failure in OTN path #1, and the failure detector 35 of the frame processing unit 13#n monitors a failure in OTN path #n. Methods of detecting failures in OTN paths are not limited particularly. For example, the failure detector 35 may monitor a failure based on input power of a corresponding optical fiber.

Alternatively, the failure detector 35 may monitor a failure based on a detection of synchronization of a received OT frame.

Further, the failure detector 35 may monitor a failure based on bit error rate.

A failure in an OTN path is monitored in the frame processing unit 13 of the currently used system. In other words, a failure in an OTN path is monitored in the frame processing unit 13 that transmits an OTN frame containing client data. However, other frame processing units 13 may monitor failures in their corresponding OTN paths, respectively. When the failure detector 35 detects a failure in a corresponding path, the failure detector 35 transmits a failure detection signal to a controller 14.

The packet processing unit 11 includes a priority detector 36 as illustrated in FIG. 3. The priority detector 36 detects the priority of input packets. The priority of each packet is specified by, for example, using a VLAN tag in layer 2 defined by IEEE802.1Q or a TOS (Type Of Service) defined by RFC2474.

Figure 6A:
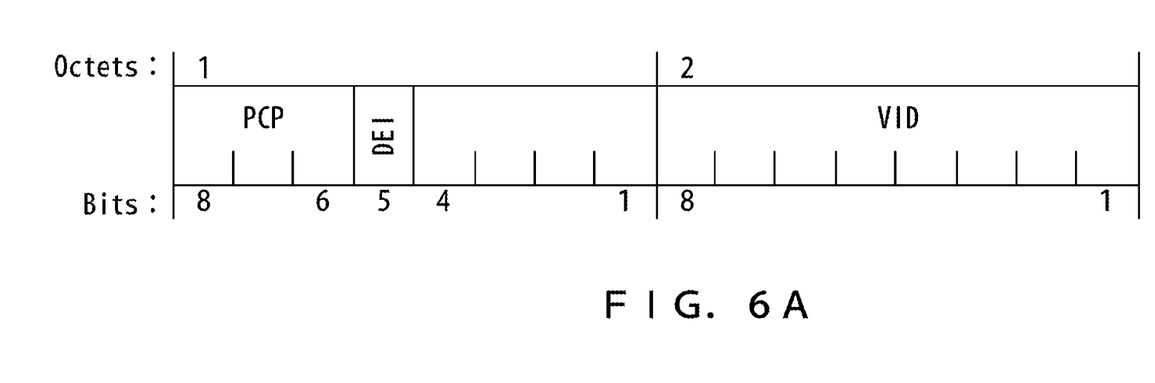
FIGS. 6A and 6B explain a VLAN tag.

A tag header of VLAN includes a TPID (Tag Protocol ID) of two bytes and TCI (Tag Control Information) of two bytes. TPID identifies whether or not a packet to which this tag header is assigned is a VLAN packet. TCI includes, as illustrated in FIG. 6A, a PCP (Priority Code Point) of three bits, a DEI (Drop Eligible ID) of one bit, and a VID (VLAN ID) of twelve bits.

Figure 6B:
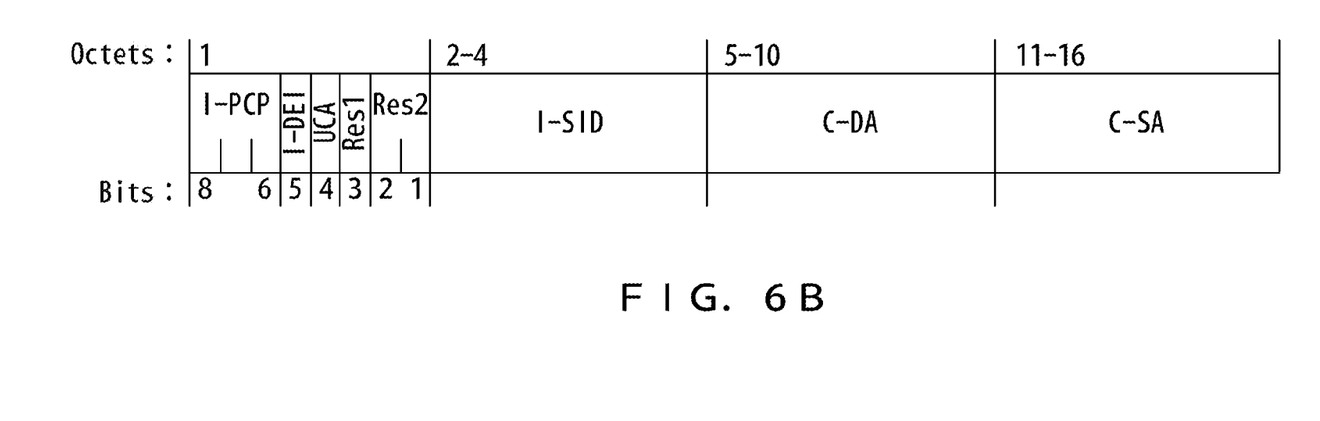

The priority of a packet is represented by PCP bits. The higher the value of a PCP bit, the higher the represented priority is. In other words, "PCP=7" represents the highest priority and "PCP=1" represents the lowest priority. Accordingly, to a packet for transmitting audio data for example, a VLAN tag containing "PCP=7" is assigned. Note that when a VLAN tag is an I-TAG, the priority of a packet is represented by I-PCP, as illustrated in FIG. 6B.

Figure 7A:
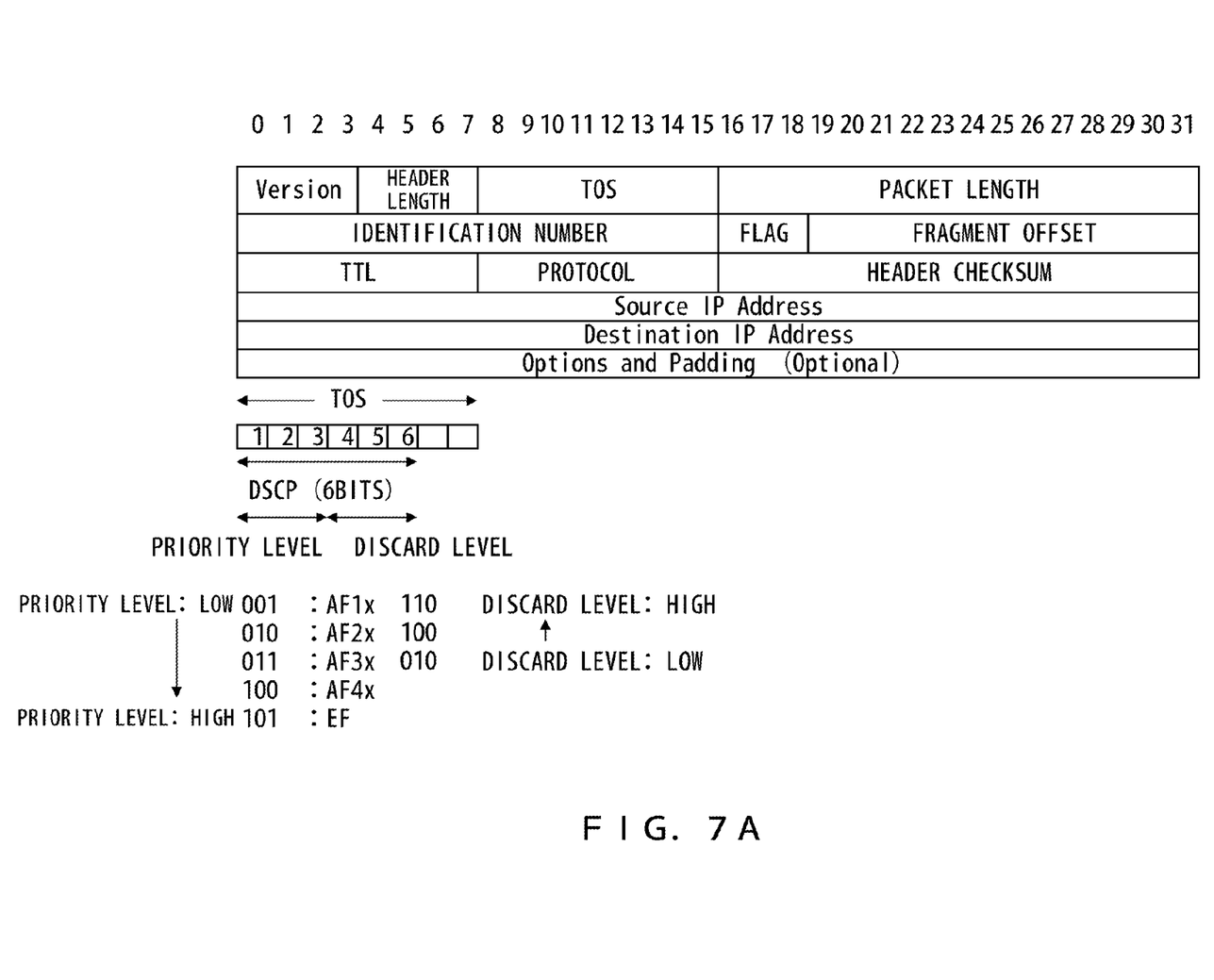
FIGS. 7A and 7B explain priority represented by using a TOS.
Figure 7B:
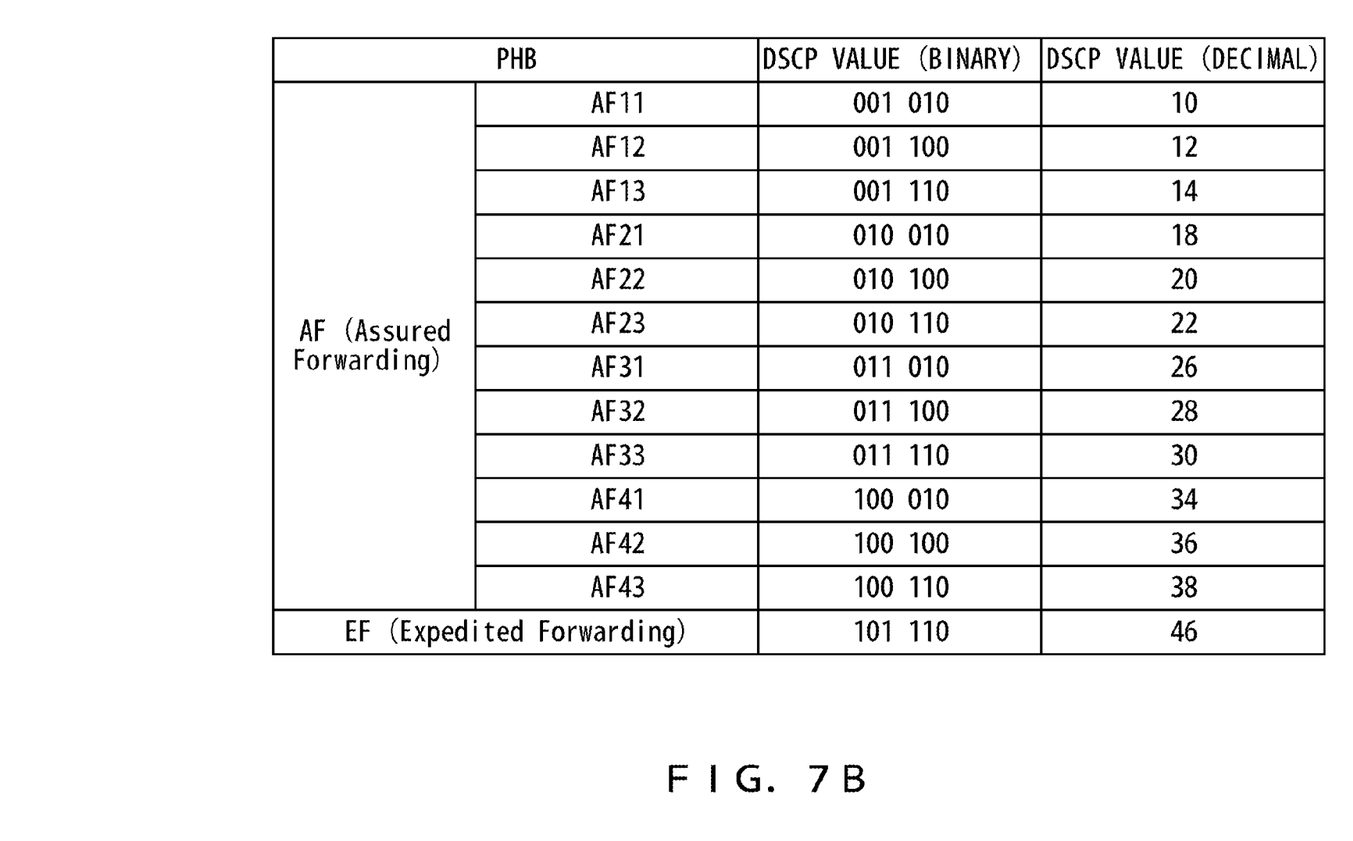

FIG. 7A and FIG. 7B explain priority represented by TOS (Type of Service). TOS is set in, for example, the IPv4 header as illustrated in FIG. 7A. Since the format of an IPv4 header is known, explanations for information other than TOS will be omitted.

TOS includes DSCP (DiffSery Code Point) of six bits. The higher three bits of DSCP represent five priority levels (001, 010, 011, 100, 101). In this example, the greater the value of a priority level, the higher the priority is. Also, the lower three bits represent three discard levels (010, 100, 110). In this example, the greater the value of a discard level, the easier the packet can be discarded.

Each packet is processed in accordance with the value of the DSCP bit (i.e., the combination of a priority level and a discard level) in transmission equipment in a network. RFC2474 defines DSCP values corresponding to respective values of PHB (Per-Hop Behavior) . In this case, "DSCP=101110" is given to the packet with the highest priority (for example, a packet containing audio data).

FIG. 3 is explained again. The priority detector 36 detects the priority of an input packet based on the PCP bits or the DSCP bits described above. The priority detector 36 reports the detected priority to the controller 14.

The controller 14 is implemented by for example a CPU or a processor system. The controller 14 controls the packet switch 12. In a normal operation (i.e., when no failures have occurred in OTN paths between the transmission equipments 1 and 2), the controller 14 controls the packet switch 12 for example so that a packet terminated by the packet processing unit 11 is transmitted through an OTN path that is specified in advance. For example, when an instruction to transmit client data through OTN path #1 has been given, the controller 14 controls the packet switch 12 so that input packets are guided to the frame processing unit 13#1.

When the controller 14 has received a failure detection signal from the frame processing unit 13, the controller 14 refers to the path management table 15 and selects a new OTN path for transmitting an input packet as an alternative path. For this process, the controller 14 refers to the path management table 15 based on the priority of an input packet reported from the priority detector 36 in the packet processing unit 11.

Figure 8A:
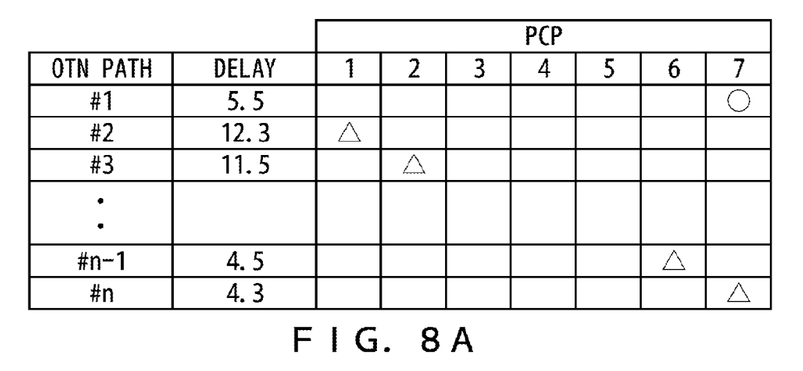
FIGS. 8A-8C illustrate examples of a path management table.
Figure 8B:
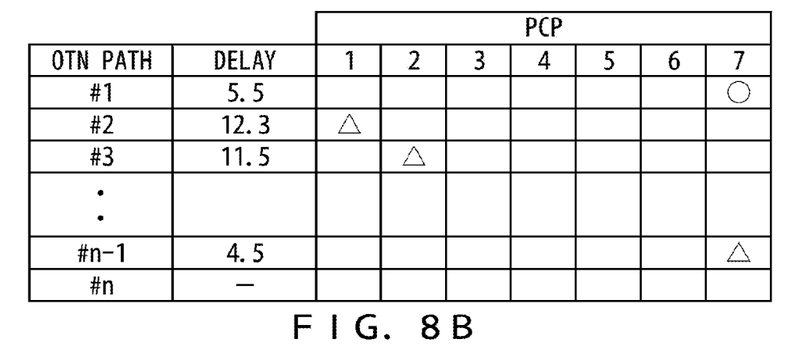
Figure 8C:
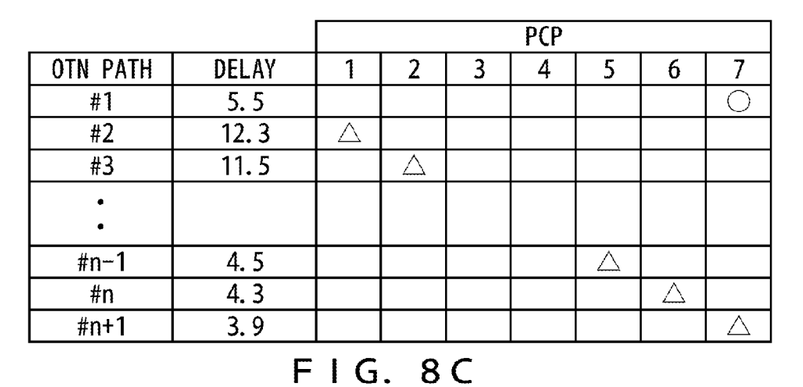

FIGS. 8A through 8C illustrate examples of the path management table 15. The path management table 15 stores information representing a transmission delay for each of OTN paths #1 through #n. The transmission delay of each OTN path is measured by the measurement unit 34 of the corresponding frame processing unit 13. In this example, each of the measurement units 34 is capable of periodically measuring the transmission delay of a corresponding OTN path regardless of whether client data is transmitted between the transmission equipments 1 and 2. In such a case, the path management table 15 is updated to reflect a latest measurement result.

In the path management table 15, information specifying alternative OTN path with respect to the priority of a packet is stored. In the example illustrated in FIG. 8A through FIG. 8C, information specifying alternative paths with respect to PCP values of a VLAN tag is stored. In FIG. 8A through FIG. 8C, the circle represents currently used paths, while the triangle represents a first alternative path. Note that the first alternative path is an OTN path that is used in place of a currently used path when a failure occurs in that currently used path.

For example, an OTN path whose transmission delay is small is assigned as a first alternative path to a packet with high priority. In the example illustrated in FIG. 8A, the transmission delay of OTN path #n is the smallest among OTN paths #2 through #n except for the currently used path. In this case, OTN path #n is specified as the first alternative path for the packet with the highest priority (i.e., the packet with "PCP=7"). On the contrary, an OTN path whose transmission delay is large is assigned as the first alternative path to a packet with low priority. In the example illustrated in FIG. 8A, the transmission delay of OTN path #2 is the largest among OTN paths #2 through #n. In this case, OTN path #2 is specified as the first alternative path for the packet with the lowest priority (i.e., the packet with "PCP=1"). Regarding other values of priority, corresponding first alternative paths are specified based on the transmission delays in a similar manner.

Transmission delays of respective OTN paths #1 through #n are not always consistent and may vary. In the example illustrated in FIG. 8B, a transmission delay of OTN path #n has not been detected due to a failure or the like. Among OTN paths #2 through #n, OTN path #n-1 has the smallest transmission delay. In such a case, OTN path #n-1 is specified as the first alternative path for the packet with the highest priority (i.e., the packet with "PCP=7").

In the example illustrated in FIG. 8C, OTN path #n+1 is added to OTN paths #1 through #n between the transmission equipments 1 and 2. OTN path #n+1 has the smallest transmission delay among OTN paths #2 through #n+1. In such a case, OTN path #n+1 is specified as the first alternative path for the packet with the highest priority (i.e., the packet with "PCP=7").

As described above, the path management table 15 is updated based on latest transmission delays measured by the respective measurement units 34. In other words, the path management table 15 always stores information for selecting an alternative path that is optimum or appropriate with respect to the priority of a packet. In addition, even when an OTN frame contains client data, the measurement unit 34 can measure transmission delay of corresponding OTN path. Accordingly, the transmission system 100 can update information for selecting an alternative path optimal or appropriate with respect to the priority of a packet without halting services.

Figure 9:
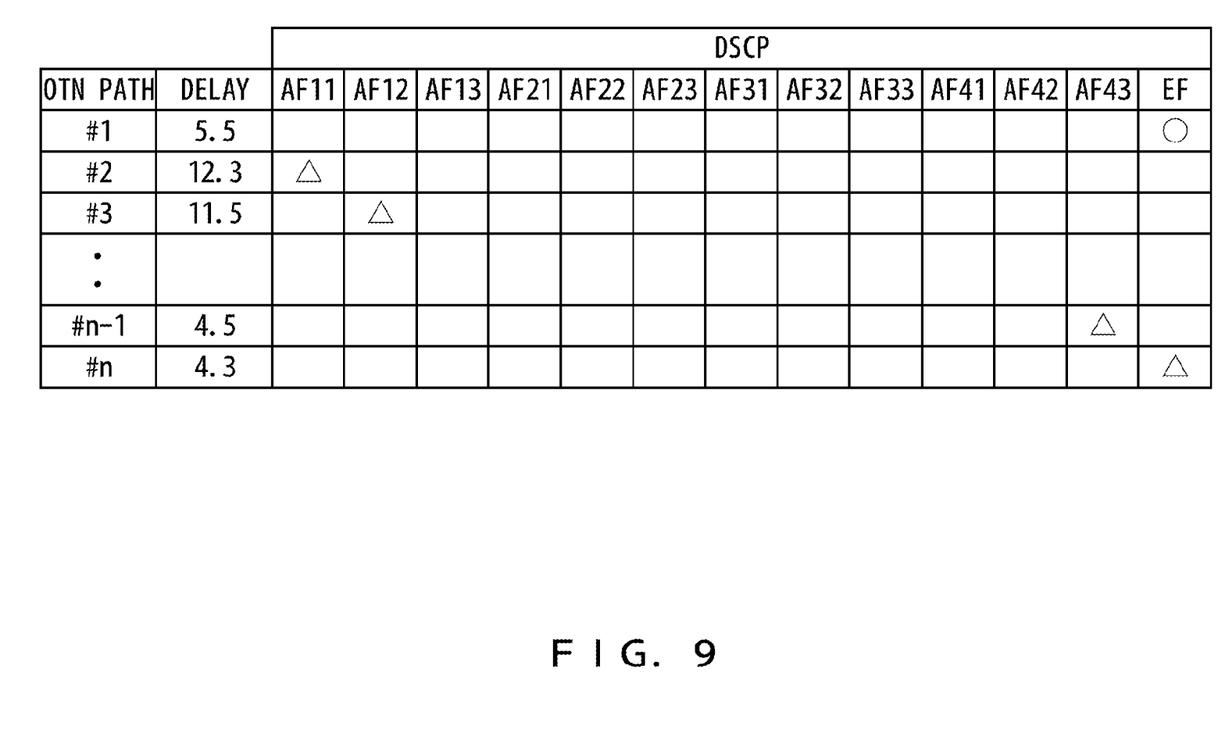
FIG. 9 illustrates another example of a path management table.

FIG. 9 illustrates another example of the path management table 15. In the example illustrated in FIG. 9, information specifying an alternative path is stored with respect to DSCP value stored in TOS of IP header. The method of updating measurement values of transmission delays and the method of updating first alternative paths corresponding to the priority of packets are substantially the same as those in the examples illustrated in FIG. 8A through FIG. 8C and FIG. 9, and accordingly the explanations thereof will be omitted.

Figure 10A:
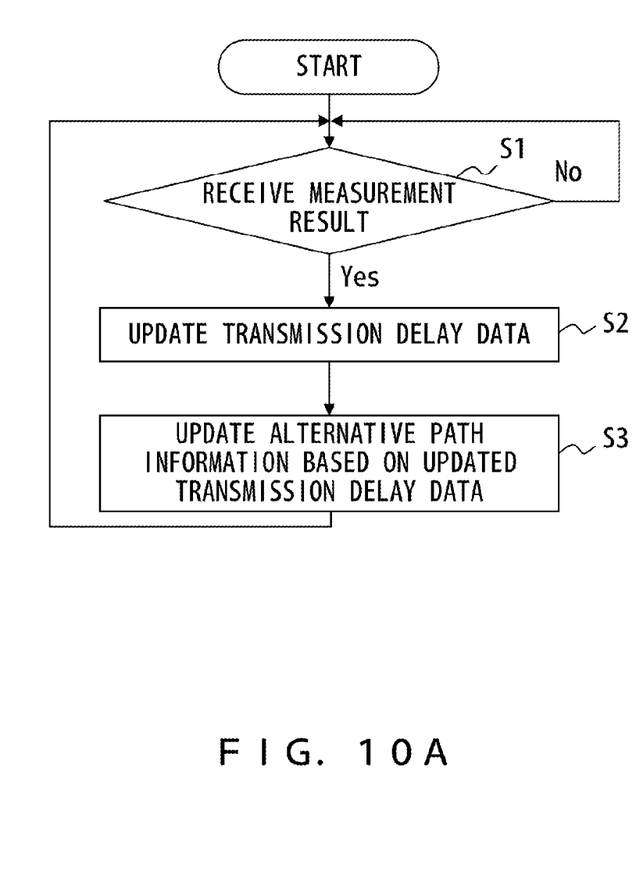
FIGS. 10A and 10B illustrate flowcharts explaining operations of a controller.
Figure 10B:
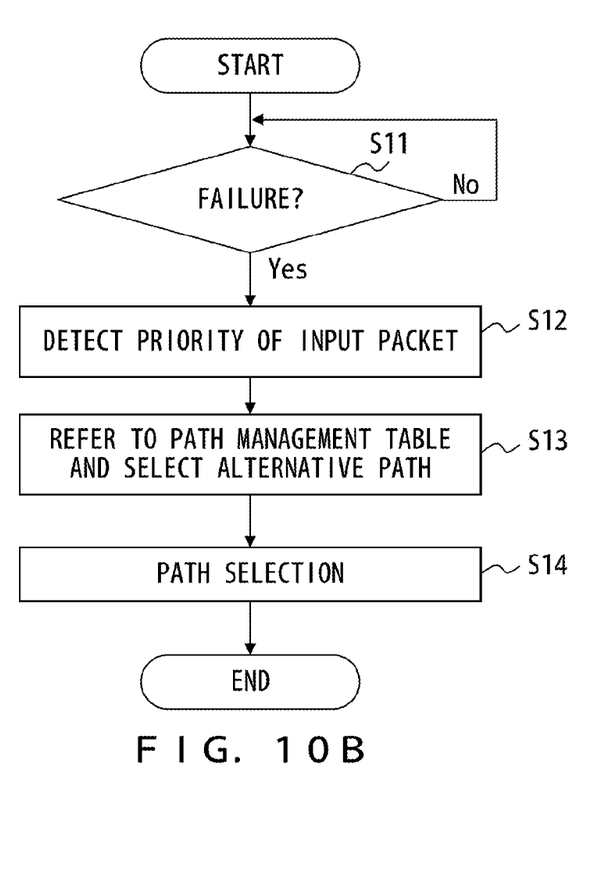

FIG. 10A and FIG. 10B are flowcharts illustrating operations of the controller 14. It is assumed that the measurement unit 34 of each of the frame processing units 13 measures a transmission delay of a corresponding OTN path periodically. It is also assumed that the failure detector 35 of each of the frame processing units 13 continuously monitors a failure in a corresponding OTN path.

FIG. 10A is a flowchart illustrating a process of updating the path management table 15. In S1, the controller 14 waits for a measurement result by the measurement unit 34 of each of the frame processing units 13. When the controller 14 receives a measurement result from the measurement unit 34, the controller 14 updates transmission delay data in the path management table 15 in S2. In S3, the controller 14 updates alternative path information based on the updated transmission delay data. When doing this, the controller 14 assigns an OTN path whose transmission delay is small as the first alternative path to a packet with high priority, and assigns an OTN path whose transmission delay is large as the first alternative path to a packet with low priority.

As described above, the path management table 15 is always updated in accordance with the latest state of an OTN network. Note that the process in the flowchart illustrated in FIG. 10A is executed while communication services between the transmission equipments 1 and 2 are provided. In other words, the path management table 15 is updated without halting communication services between the transmission equipments 1 and 2.

FIG. 10B is a flowchart illustrating path selection executed in response to a failure in an OTN network. In S11, the controller 14 monitors a failure in a currently used path (i.e., an OTN path selected by the controller 14 for transmitting client data). In this monitoring, the controller 14 waits for a failure detection signal from the failure detector 35 of the frame processing unit 13 that transmits an OTN frame via the currently used path. When a failure is detected in the currently used path, the controller 14 detects the priority of an input packet in S12. The priority of an input packet is detected by the priority detector 36 in the packet processing unit 11 and is reported to the controller 14.

In S13, the controller 14 refers to the path management table 15 and selects an alternative path that corresponds to the priority of the input packet. In this operation, the controller 14 selects an alternative path that corresponds to the PCP bits of the VLAN tag or the DSCP bits of the IPv4 header. When the PCP bits of a VLAN tag are used, the controller 14 refers to the path management table illustrated in FIG. 8A through FIG. 8C. When the DSCP bits of an IPv4 header are used, the controller 14 refers to the path management table illustrated in FIG. 9.

It is assumed for example that the path management table 15 has been updated to a state illustrated in FIG. 8A when a failure is detected in a currently used path. It is also assumed that an input packet includes "PCP=7". In such a case, the controller 14 obtains "alternative path=#n" by referring to the path management table 15.

In S14, the controller 14 performs path selection in accordance with the selected alternative path. In this operation, the controller 14 changes the connection between an input port and an output port of the packet switch 12 in accordance with the selected alternative path. By so doing, an input packet is guided to the frame processing unit 13 that accommodates the newly selected OTN path. Accordingly, this frame processing unit 13 outputs the OTN frame for containing the input packet to the newly selected GIN path. In addition, the controller 14 reports the result of the path selection to the correspondent equipment (i.e., the transmission equipment 2).

SECOND EMBODIMENT

In the first embodiment, transmission equipment on the transmission side (i.e., the transmission equipment 1) transmits an OTN frame containing client data via one of the plurality of GIN paths #1 through #n. In the second embodiment by contrast, transmission equipment on the transmission side transmits OTN frames respectively containing client data in parallel via the plurality of OTN paths #1 through #n. In other words, OTN frames that are substantially identical are transmitted from the transmission equipment 1 to the transmission equipment 2 via the plurality of OTN paths #1 through #n. The transmission equipment on the reception side (the transmission equipment 2 in FIG. 1) specifies one of the plurality of OTN paths #1 through #n as a currently used path, and extracts the client data from the OTN frame received via that currently used path.

Figure 11:
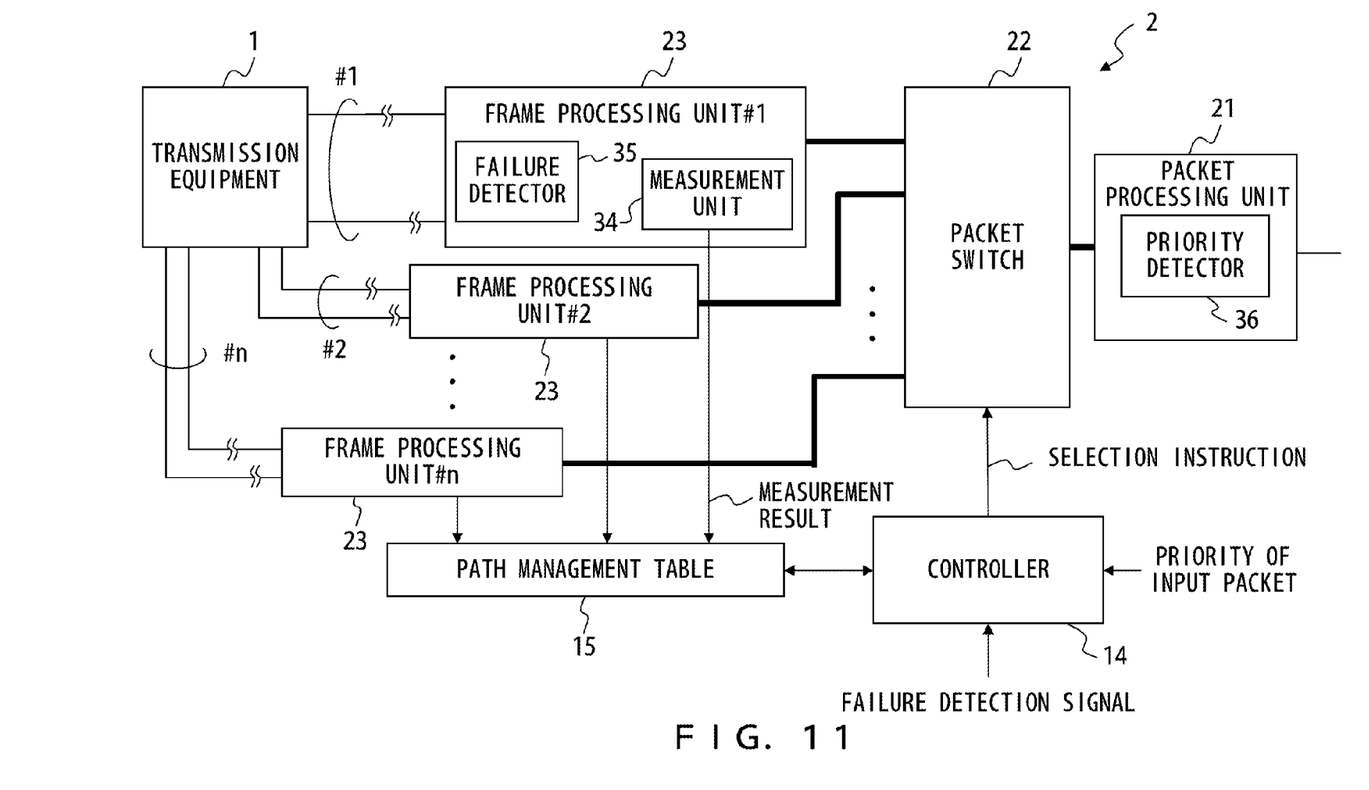
FIG. 11 illustrates a configuration of transmission equipment according to a second embodiment.

FIG. 11 illustrates a configuration of transmission equipment according to the second embodiment. The transmission equipment 2 illustrated in FIG. 11 corresponds to the transmission equipment 2 illustrated in FIG. 1. Note that functions that are not related to path selection directly are omitted in FIG. 11.

In the second embodiment, the transmission equipment 2 receives substantially identical OTN frames from the transmission equipment 1 via the plurality of OTN paths #1 through #n. Each of the frame processing units 23 reproduces a packet from an OTN frame received via corresponding OTN path.

The controller 14 specifies one of the plurality of OTN paths #1 through #n as a currently used path. Thereafter, the controller 14 controls the packet switch 22 so that a packet obtained by the frame processing unit 23 corresponding to that currently used path is guided to the packet processing unit 21. The packet processing unit 21 transfers the packet received through the packet switch 22 to a client.

Similarly to the first embodiment, each of the frame processing units 23 includes the measurement unit 34 and the failure detector 35. As described above, the measurement unit 34 measures a transmission delay between the transmission equipments 1 and 2 for a corresponding OTN path. The path management table 15 is updated by the controller 14 based on measurement results by the measurement unit 34 similarly to the first embodiment. The failure detector 35 detects a failure in a corresponding OTN path as described above.

When the controller 14 detects a failure in a currently used path, the controller 14 refers to the path management table 15 and thereby selects an alternative path based on the priority of a packet. In this example, the priority of the packet is reported for example from the packet processing unit 21 of the transmission equipment on the transmission side (i.e., the transmission equipment 1) to the controller 14 of the transmission equipment 2. Alternatively, the controller 14 may obtain a detection result by the priority detector 36 of the packet processing unit 21 in the transmission equipment 2.

It is desirable that path selection be controlled based on the priority of an input packet detected in the transmission equipment on the transmission side. However, in a transmission system that successively transmits packets having the same priority, it is expected that the same OTN path will be selected regardless of whether priority detected by the transmission equipment on the transmission side or priority detected by the transmission equipment on the reception side is used for controlling the path selection.

The path management table 15 is substantially the same between the first and second embodiments. Accordingly, when the priority of a packet is high, an OTN path whose transmission delay is small is selected as an alternative path. When the priority of a packet is low, an OTN path whose transmission delay is large is selected as an alternative path.

ANOTHER EMBODIMENT

Although an Ethernet packet is mapped onto an OTN frame so as to be transmitted in the above examples, the scope of the present invention is not limited to this configuration. In other words, path selection according to an embodiment of the present invention can be used in a transmission system in which a packet or frame, according to a first communication scheme, containing client data is mapped onto a frame according to a second communication scheme.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. Transmission equipment that is used in a transmission system in which a plurality of paths are provided between the transmission equipment and correspondent equipment, the transmission equipment comprising:
a measurement unit configured to measure respective transmission delays of the plurality of paths by using a frame transmitted between the transmission equipment and the correspondent equipment;
a detector configured to detect a priority of an input packet;
a selector configured to select a path for transmitting the input packet from among the plurality of paths; and
a frame processing unit configured to transmit a frame onto which the input packet is mapped, to the correspondent equipment through a path selected by the selector, wherein the selector selects an alternative path for transmitting the input packet from among the plurality of paths based on the priority of the input packet detected by the detector and respective transmission delays of the plurality of paths measured by the measurement unit when a failure occurs in a path that has been selected by the selector.

2. The transmission equipment according to claim 1, wherein
the frame is an OTN (Optical Transport Network) frame, and
the measurement unit measures respective transmission delays of the plurality of paths between the transmission equipment and the correspondent equipment by using a Delay Measurement bit provided in a header of an OTN frame.

3. The transmission equipment according to claim 1, wherein
a virtual LAN tag is given to the input packet, and the detector detects the priority of the input packet based on PCP (Priority Code Point) provided in the virtual LAN tag that is given to the input packet.

4. The transmission equipment according to claim 1, wherein
the input packet includes an IP header, and
the detector detects the priority of the input packet based on DSCP (DiffSery Code Point) provided in the IP header of the input packet.

5. The transmission equipment according to claim 1, further comprising
a storage unit configured to store information representing respective transmission delays of the plurality of paths measured by the measurement unit, wherein
the measurement unit measures respective transmission delays of the plurality of paths repeatedly,
the information stored in the storage unit is updated in accordance with measurement results by the measurement unit, and
the selector selects a path for transmitting the input packet from among the plurality of paths according to the information stored in the storage unit.

6. A transmission system that includes first transmission equipment, second transmission equipment and a plurality of paths provided between the first transmission equipment and the second transmission equipment, wherein
the first transmission equipment includes a first frame processing unit configured to transmit a frame onto which a packet input to the first transmission equipment is mapped, to the second transmission equipment respectively through the plurality of paths, and
the second transmission equipment includes:
a measurement unit configured to measure respective transmission delays of the plurality of paths by using a frame transmitted between the second transmission equipment and the first transmission equipment;
a second frame processing unit configured to reproduce the packet from respective frames received from the first transmission equipment via the plurality of paths; and
a selector configured to select one of the plurality of paths and output a packet reproduced from a frame received via the selected path, and
the selector selects an alternative path from among the plurality of paths based on a priority of the packet and respective transmission delays of the plurality of paths measured by the measurement unit when a failure occurs in a path that has been selected by the selector.

7. A path selection method that is used in a transmission system in which a plurality of paths are provided between first transmission equipment and second transmission equipment, the path selection method comprising:
measuring respective transmission delays of the plurality of paths by using a frame transmitted between the first transmission equipment and the second transmission equipment;

detecting a priority of an input packet input to the first transmission equipment;

selecting an alternative path for transmitting the input packet from among the plurality of paths based on the priority of the input packet and respective transmission delays of the plurality of paths when a failure occurs in a currently used path that transmits a frame onto which the input packet is mapped; and transmitting the frame onto which the input packet is mapped through the alternative path selected from among the plurality of paths from the first transmission equipment to the second transmission equipment.

* * * * *